Aug. 31, 1926.

K. M. MILLER

NUTCRACKER

Filed Nov. 7, 1925

1,598,490

INVENTOR.
Kenneth M. Miller,
BY
Geo. P. Kimmel. ATTORNEY.

Patented Aug. 31, 1926.

1,598,490

UNITED STATES PATENT OFFICE.

KENNETH M. MILLER, OF LONG BEACH, CALIFORNIA.

NUTCRACKER.

Application filed November 7, 1925. Serial No. 67,575.

This invention relates to nut cracking devices and has for its primary object the provision, in a manner as hereinafter set forth, of a nut cracker of an improved design whereby the shell of a nut may be easily and quickly cracked without mashing or breaking the kernel contained therein.

Another object of the invention is the provision, in a manner as hereinafter set forth, of a nut cracker of such a design as to retain the nut in proper position between the jaws thereof, without the necessity of the user holding it in position.

Still another object of the invention is the provision, in a manner as hereinafter set forth, of a nut cracker so designed that the broken shell and kernel will not fall from between the jaws of the cracker when the same are opened after breaking a shell.

A final object of the invention is the provision, in a manner as hereinafter set forth, of a nut cracker of improved and unique design, simple and easy to operate, strong and durable, and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1:
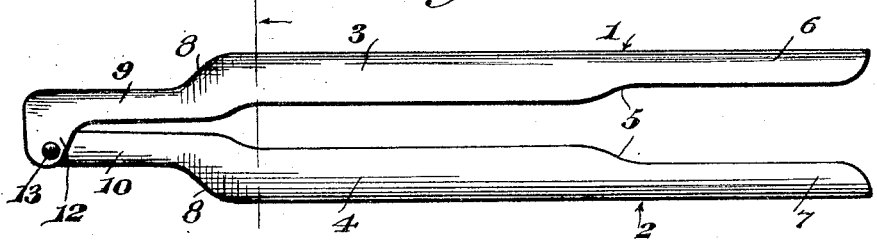
Figure 1 is a side elevation of the device embodying this invention.

Referring now to the drawing in detail wherein like numerals of reference indicate corresponding parts throughout the several views, the device embodying this invention comprises two jaw members indicated generally by the numerals 1 and 2.

Figure 4:
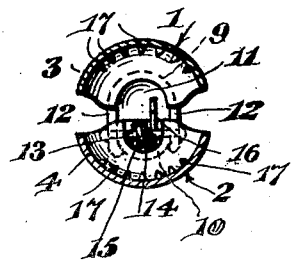
Figure 4 is a transverse section taken upon the line 4—4 of Figure 1.

Each of the members is, as shown clearly in Figure 4, substantially semi-cylindrical in cross section and each is formed integrally in three distinct portions. The central portions 3 and 4 of each of the members 1 and 2 comprise the jaws proper of the device and each of these portions at one end is cut inwardly upon each side as is indicated at 5 setting up handle portions 6 and 7.

Figure 3:
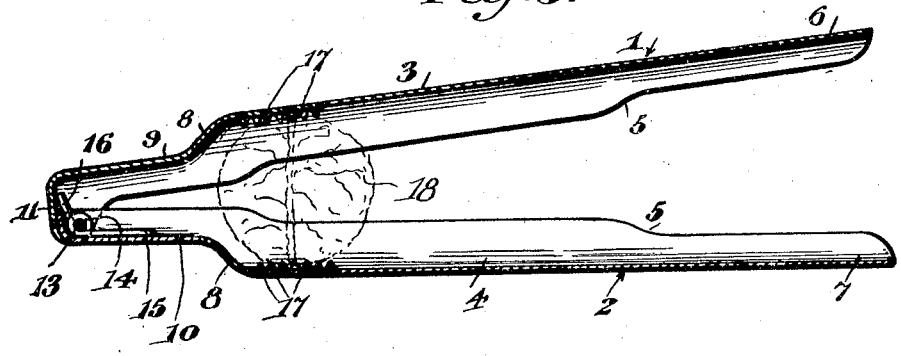
Figure 3 is a central longitudinal view of the nut cracker.

At the forward end of each of the jaw portions 3 and 4 the jaw proper is constricted forming the shoulders 8 and extending forwardly from these shoulders 8 are the constricted forward or bill portions 9 and 10. As is clearly shown in Figure 3 the members 1 and 2 are substantially semicircular throughout and the forward end of the bill 9 is turned downwardly or closed as indicated at 11, and adjacent each side of this closed end an ear 12 is formed, forming an extension from the side of the bill and extending a substantial distance beyond the lower edge of the end 11. The forward end of the lower bill 10 is cut square across as is shown in Figure 3. The lower bill 10 is of less width at the forward end than the upper bill 9 and this forward end of the lower bill 10 is positioned between the ears 12 and a pivot pin 13 is extended between the ears and the sides of the bill 10 to pivotally secure the same together. Wrapped about this pivot pin 13 is a coil spring 14 one end 15 of which lies against the inner side of the lower bill 10 while the other end 16 bears against the inner side of the end 11 of the upper bill 9. From the action of this spring it will be readily seen that the nut cracker will normally be retained in open position.

Figure 2:
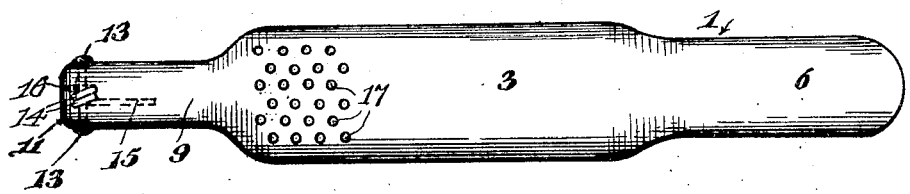
Figure 2 is a top plan view of the same.

The inner side of each of the proper jaw members 3 and 4, adjacent the shoulders 8 is provided with a plurality of inwardly extending teeth 17 punched inwardly from the body of each of the members as shown in Figure 2.

It will be readily seen from the foregoing that when a nut, such as that indicated in dotted lines by the numeral 18 is placed between the studded inner faces of the jaws, it will be held securely in position by the curved configuration of the jaws and when the shell is broken the parts will not fall from the cracker but will be retained in the lower channel shaped jaw member 2.

It will also be seen that the bill members 9 and 10 are not in alignment with the jaws proper but are set inwardly of the inner side thereof and because of this the jaws proper cannot be brought in such a close contact as to crush the kernel of the nut when the shell is cracked.

Having thus described my invention what I claim is:—

1. A nut cracker of the character described, comprising a pair of members hingedly connected together, said members being formed to set up a pair of small contacting jaws, and a pair of large jaws held in spaced parallel relation by said small jaws, when the cracker is closed.

2. A nut cracker of the character described, comprising a pair of members hingedly connected at one end, said members being formed to set up a pair of small contacting bill jaws at their hinged ends, and a pair of large jaws rearwardly of said small jaws and held in spaced relation thereby.

3. A nut cracker of the character set forth, comprising a pair of members each having a parallel offset portion at one end, means for pivotally connecting the free ends of said offset portions in a manner to enable the same to be brought into parallel contact, and engaging teeth formed upon the opposed faces of the other portions of the members.

4. A nut cracker of the character described, comprising a pair of elongated members substantially semi-circular in cross section, each having a relatively short constricted parallel offset portion at one end, means for pivotally securing the free ends of said offset portions together in a manner to set up convex contacting jaws, and nut engaging teeth formed upon the opposed convex surfaces of the other portion of the members, said toothed portions of the members being held in spaced parallel relation when the cracker is closed.

In testimony whereof, I affix my signature hereto.

KENNETH M. MILLER.